(12) United States Patent
Gindorf et al.

(10) Patent No.: US 9,114,476 B2
(45) Date of Patent: Aug. 25, 2015

(54) DUAL BLISKS IN THE HIGH-PRESSURE COMPRESSOR

(75) Inventors: Alexander Gindorf, Schwabhausen (DE); Marcus Klemm, Germering (DE)

(73) Assignee: MTU AERO ENGINES GMBH, Munich (DE)

( * ) Notice: Subject to any disclaimer, the term of this patent is extended or adjusted under 35 U.S.C. 154(b) by 499 days.

(21) Appl. No.: 13/185,627

(22) Filed: Jul. 19, 2011

(65) Prior Publication Data

US 2012/0027603 A1   Feb. 2, 2012

(30) Foreign Application Priority Data

Jul. 28, 2010   (DE) .......................... 10 2010 032 464

(51) Int. Cl.
| | |
|---|---|
| *B23K 11/24* | (2006.01) |
| *F01D 5/14* | (2006.01) |
| *B23K 11/02* | (2006.01) |
| *F01D 5/30* | (2006.01) |
| *F01D 5/34* | (2006.01) |
| *F04D 29/02* | (2006.01) |
| *F04D 29/32* | (2006.01) |

(52) U.S. Cl.
CPC .............. *B23K 11/02* (2013.01); *F01D 5/3061* (2013.01); *F01D 5/34* (2013.01); *F04D 29/023* (2013.01); *F04D 29/321* (2013.01); *F04D 29/324* (2013.01); *B23K 2201/001* (2013.01); *B23K 2203/14* (2013.01); *F05C 2201/90* (2013.01)

(58) Field of Classification Search
CPC ...... B23K 13/02; B23K 13/04; B23K 13/043; B23K 13/046; B23K 13/06; B23K 13/08

USPC .............. 416/193 A, 193 R, 194, 248, 213 A, 416/213 R, 241 R, 234
See application file for complete search history.

(56) References Cited

U.S. PATENT DOCUMENTS

| | | | | |
|---|---|---|---|---|
| 2,831,958 A | * | 4/1958 | Richardson | ............... 219/137 R |
| 5,551,840 A | | 9/1996 | Benoit et al. | |
| 6,128,820 A | * | 10/2000 | Nolan et al. | ................. 29/889.1 |

(Continued)

FOREIGN PATENT DOCUMENTS

| | | | |
|---|---|---|---|
| DE | 19831736 A1 | | 2/2000 |
| WO | WO 2009049596 A1 | * | 4/2009 |

OTHER PUBLICATIONS

"Recent Titanium Research and Development" by D. Helm, O. Roder, MTU Aero Engines, Munich, Germany.*

(Continued)

*Primary Examiner* — Dwayne J White
*Assistant Examiner* — Justin Seabe
(74) *Attorney, Agent, or Firm* — Barlow, Josephs & Holmes, Ltd.

(57) ABSTRACT

The invention relates to a high-pressure compressor of a gas turbine having at least one blisk, specifically a disk with a plurality of blades that are disposed on the disk, wherein the blisk has at least one titanium material from the group that comprises Ti-6246 and Ti-6242, wherein the materials of the disk and the blades of the blisk differ in their chemical composition and/or their microstructure. The blades are welded to the disk, in particular, by means of a pressure welding method supported by high-frequency current, whereby the current is conducted through the joint surfaces and leads to local limited melting therein.

4 Claims, 1 Drawing Sheet

(56) References Cited

U.S. PATENT DOCUMENTS

| | | | |
|---|---|---|---|
| 6,471,485 B1* | 10/2002 | Rossmann et al. | 416/230 |
| 6,616,408 B1* | 9/2003 | Meier | 416/193 A |
| 7,841,506 B2 | 11/2010 | Hall et al. | |
| 8,375,582 B2* | 2/2013 | Bayer et al. | 29/889.21 |
| 2003/0000602 A1 | 1/2003 | Smith et al. | |
| 2006/0034695 A1 | 2/2006 | Hall et al. | |
| 2009/0265933 A1 | 10/2009 | Schreiber | |
| 2009/0290985 A1 | 11/2009 | Hanrieder et al. | |
| 2010/0040455 A1* | 2/2010 | Hanrieder et al. | 415/115 |
| 2010/0284817 A1* | 11/2010 | Bamberg et al. | 416/241 R |

OTHER PUBLICATIONS

"Recent Titanium Research and Development in Germany" from "Get Infol; Find the world of science and technology" for the date of publication of the paper/conference.*

"High Frequency Welding—The Process and Applications"; Apr. 5, 1999.*

"Optimizing Efficiency in HF Tube Welding Processes", Wright, John; Nov.-Dec. 1999.*

* cited by examiner

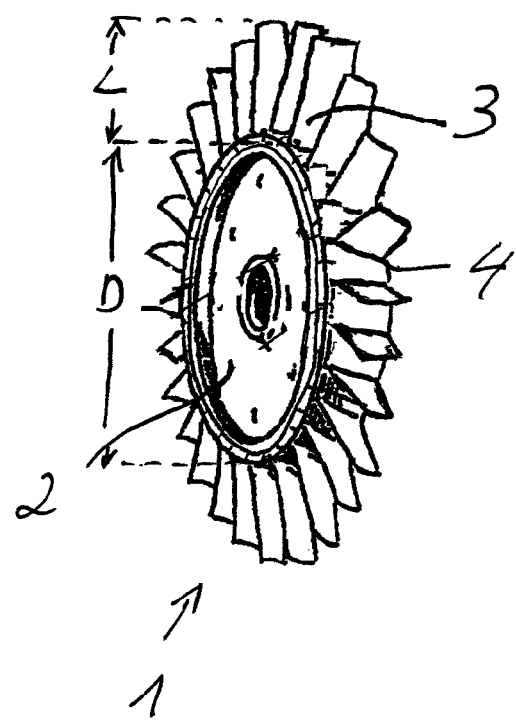

DUAL BLISKS IN THE HIGH-PRESSURE COMPRESSOR

BACKGROUND OF THE INVENTION

1. Field of the Invention

The invention relates to a high-pressure compressor in a gas turbine, particularly of an aircraft engine with at least one blisk made of a disk and a plurality of blades that are disposed on the disk, or a corresponding blisk that that is formed from at least one material from the group that comprises Ti-6246 and Ti-6242.

2. Prior Art

Compressors of gas turbines and aircraft engines, in particular, serve for compressing suctioned quantities of air that are burned in the combustion chamber along with the fuel. In today's engines, compression ratios of more than 30 to 1 are achieved in this way, wherein different compressor stages are utilized, i.e., low-pressure and high-pressure compressors. These compressors have a plurality of compressor impellors or rotors disposed one behind the other that very rapidly rotate between stationary guide blades. The compressor impellors are moved via shafts driven by the turbine and each comprise a disk and a plurality of blades that are disposed on the disk.

In order to avoid edge loading of the disk by avoiding additional connection components between disk and blades, such as blade feet and disk channels, and to achieve a corresponding savings in weight, it is known in the prior art to use so-called blisks that may also be called integrally bladed rotors. The term blisk is composed of the words blade (blade) and disk (disc) and shall convey the meaning that the blades are integrally disposed on the disk. In addition, so-called blings are also known, the word bling standing for bladed ring, wherein, corresponding to the blisk, the blades are disposed integrally on a corresponding ring. In the following, for purposes of the present description, under the term blisk will also be understood the corresponding components that could be provided with the designation bling.

The integral blading of the blisk has the disadvantage that the selection of material and the structural arrangement of the blades and the disk is limited by the manufacturing methods that are possible. There are extensive limitations, in that the materials and their microstructure could be modified unfavorably by inappropriate joining methods or in that certain joining methods are not available for reasons of structural specifications. This is particularly true for blisks that will be used in high-pressure compressors, since rotors that have very many blades with short blade lengths, i.e., smaller radial dimensions (considered in relation to the blisk) are used in high-pressure compressors. Therefore, for example, welding methods may be utilized for welding blades to the disk, but these are not applicable for blisks in high-pressure compressors, even though they can be utilized for other rotors. Examples of these are linear friction welding or inductive pressure welding, in which the joint surfaces are heated and melted by an induction coil.

Likewise, there is also the requirement to use different materials for blades and disk in the case of blisks that will be used in high-pressure compressors. There is the requirement for being able to undertake a separate adapting of the property profiles for blades and disk, particularly for titanium materials that are utilized for the production of blisks for high-pressure compressors.

SUMMARY OF THE INVENTION

Problem of the Invention

Therefore, the problem of the present invention is to provide a corresponding compressor, particularly a high-pressure compressor or corresponding blisks for a compressor, particularly a high-pressure compressor as well as a method for the production thereof, in which an optimal design of the properties of blades and disk of impellers in (high-pressure) compressors is possible. In particular, the corresponding blisks shall be simple to manufacture or a corresponding method shall be applicable in a simple way for the manufacture.

Technical Solution

This problem is solved by a high-pressure compressor with the features of claim 1, a corresponding blisk with the features of claim 6 as well as a method for the production of a blisk with the features of claim 11 and a gas turbine with the features of claim 12. Advantageous embodiments are the subject of the dependent claims.

The invention starts with a blisk made of a disk and a plurality of blades that are disposed on the disk, for the (high-pressure) compressor of a gas turbine, wherein the disk and/or the blades are formed from a titanium material, and specifically the titanium material Ti-6246 or Ti-6242. The titanium material Ti-6246 has a chemical composition that comprises 6 wt. % aluminum, 2 wt. % tin, 4 wt. % zirconium and 6 wt. % molybdenum with the remainder of titanium and unavoidable impurities. The titanium material Ti-6242 has a chemical composition containing 6 wt. % aluminum, 2 wt. % tin, 4 wt. % zirconium and 2 wt. % molybdenum with the remainder of titanium and unavoidable impurities. These materials have proven particularly advantageous for impellers or rotors in the high-pressure compressor of a gas turbine and especially of an aircraft engine. According to the invention, a corresponding blisk is formed for a high-pressure compressor with a disk and a plurality of blades, in which disk and blades differ in their chemical composition of the materials and/or of their microstructure. Thus, an optimal property profile of the blisk with individually adapted properties of the disk and the blades can be achieved.

In this way, the disk can be formed from the material Ti-6246 and the blades can be formed from the material Ti-6242 or Ti-6246.

In one embodiment, the disk can have a lamellar structure with a microstructure made of a plurality of lamellae of α- and β-titanium lying next to one another.

In addition, the blades can have a bimodal structure, in which equiaxal structural components of α-titanium and β-titanium are present.

The blades can or will be welded to the disk by the so-called direct high-frequency pressure welding method, in which high-frequency current is conducted through the surfaces to be joined, thus the joint surfaces of the components to be welded, i.e., the blades and disk, in the direct high-frequency pressure welding method. This can be conducted, for example, by connecting the components to be welded in series in a circuit. At the same time, the components that are to be welded are disposed at a short distance to one another, so that the current flow is limited to the surface regions, on the one hand, by the skin effect for current flow, and, on the other hand, by the proximity effect of the components disposed next to one another, so that a local heating and a local melting of the joint surfaces are produced by the high-frequency current. As soon as the joint surfaces are sufficiently heated, the components to be welded are pressed onto one another, so that bonding can take place.

This method has the advantage that it only requires a small space, since the arrangement of electrodes for introducing the current requires little space, for example, in comparison to the inductive high-frequency pressure welding method in which a corresponding induction coil is necessary for generating high-frequency induction currents. Also, in comparison to linear friction welding, which is frequently used in the production of blisks, in the case of direct high-frequency pressure welding, a much smaller space is necessary, so that the application of this method to blisks in high-pressure compressors is possible, in which a smaller structural space is available due to the plurality of blades with small dimensions.

By the direct high-frequency pressure welding method, in addition, there is the advantage that, unlike the case of linear friction welding, no relative motion of the joint surfaces to one another is necessary, which also has as a consequence corresponding advantages for the structural formation in the welding structure, since only a linear pressing movement is necessary, perpendicular to the joint surfaces. By this means, shearing forces on the structural regions next to the surface, as occur in the case of linear friction welding, are avoided, and this can be advantageously recognized correspondingly in the microstructure of the welded joint.

Due to the local limiting of the melting of the joint surfaces, corresponding components, specifically blades and disk that already have a finished structure can be welded together, since effects on the microstructure are to be expected only in the very limited joining region.

A post-processing of the blisks may only be needed to the extent that the final contour of the blades will be produced by a corresponding machining operation.

BRIEF DESCRIPTION OF THE DRAWING

Further advantages, characteristics and features of the present invention will be made clear in the following detailed description of an example of embodiment based on the appended FIGURE.

The FIGURE shows an embodiment of a blisk according to the present invention in purely schematic form.

DETAILED DESCRIPTION OF THE PREFERRED EMBODIMENT

The FIGURE shows a perspective representation of a so-called blisk (bladed disk) as it is used as a rotor in a gas turbine and, in particular, in a high-pressure compressor of a gas turbine. The characterizing feature of blisk 1 is the integral design of rotor blades 3 on disk 2. The advantage of a blisk is that the joining elements between blades and disk, such as blade feet and disk channels, can be dispensed with, so that smaller edge loads result for the disk as well as a corresponding savings in weight. Of course, the selection of materials and establishing the structure of the materials in the respective components is limited by the integral design of blades and disk 2, 3. With the present invention, however, this problem can be solved, so that even in rotors or impellers in high-pressure compressors, in which there is great limitation due to the limited structural space based on the plurality of blades 3 and the small dimension of blades 3, different materials and/or materials with different structural formations can be used for blades and disk.

In this way, it is achieved that the blades 3 are welded onto the disk 2 by a special method, which makes it possible that a secure welded joint 4 is assured with respect to the titanium materials that are preferably to be used. The corresponding welding method is a pressure welding method, in which the components to be joined are pressed together by their joint surfaces, thus blades 3 with blade feet 4, on the one hand, and disk 2, on the other hand, after heating and melting the joint surfaces. Melting is achieved here by introducing a high-frequency current with frequencies in the range of 0.75 MHz to 2.5 MHz, so that a melting can be achieved only locally in the region of the joint surfaces due to the so-called skin effect. This can also be supported by the fact that the components are disposed at a very short distance of 0.5 mm to 1 mm relative to one another during the heating phase, thus during the phase of passage of the high-frequency current, so that the current flow and thus the heating as well as the melting are limited to the regions near the surface due to the so-called proximity effect. In this way it is possible to largely obtain the established structure of the components to be welded, specifically blades 3 and disk 2, and to produce only a constricted joining region with welded structure.

Due to the direct introduction of the high-frequency current into the joint surfaces, in which the components to be joined, specifically disk and blades, can be connected in series in a circuit, the use of induction coils can be omitted, so that a smaller structural space, such as is present especially in high-pressure compressors or the corresponding impellers, is sufficient. Due to the small structural space, as it is present in high-pressure compressors because of the small dimensions of the blades and the constricted arrangement of the blades, other welding methods, such as linear friction welding are also not possible. In addition, the direct high-frequency pressure welding that is used according to the invention has the advantage that only a movement of the components to be welded perpendicular to the joint surfaces is necessary by pressing, and not a movement of the joint surfaces relative to one another, so that the structural formation is also improved in this way.

Correspondingly, it is also possible to use integrally bladed rotors with different material combinations and/or different structural formations in impellers or blisks in the high-pressure compressor region of a gas turbine.

As is shown in the FIGURE, the radial length L of blades 3 in the high-pressure compressor is smaller, in particular very much smaller, than the diameter D of disk 2, which illustrates the small structural space.

The high-pressure compressor according to the invention has blisks whose disks 2 are formed from the titanium material Ti-6246, wherein the titanium material Ti-6246 contains 6 wt. % aluminum, 2 wt. % tin, 4 wt. % zirconium and 6 wt. % molybdenum with the remainder of titanium and unavoidable impurities. This material can be particularly present in a lamellar structure, in which the structure is predominantly composed of lamellae of α- and β-titanium.

The blades can be formed from the same material, thus Ti-6246, whereby the blades can be formed in particular with a bimodal structure with equiaxial α- and β-titanium structural components. In addition, blades 3 can also be formed of the titanium material Ti-6242, which essentially comprises 6 wt. % aluminum, 2 wt. % tin, 4 wt. % zirconium and 2 wt. % molybdenum with the remainder of titanium and unavoidable impurities.

These types of blisks are characterized by a balanced property profile, especially for application in the high-pressure compressor region of an aircraft engine.

Although the present invention has been described in detail on the basis of the example of embodiment, it is obvious to a person skilled in the art that the invention is not limited to this example of embodiment, but rather that variations can be carried out within the scope of the protective range of the appended claims, particularly by other types of combinations of the features that were presented or by the omission of individual features.

What is claimed is:

1. A method for the production of an integrally bladed rotor of a high-pressure compressor having a compression ratio of more than 30 to 1, the method comprising the steps of:
   providing a disk that is formed from Ti-6246 or lamellar Ti-6246;
   providing blades that are formed from Ti-6242 or bimodal Ti-6246, the blades having joint surfaces that can each be secured to respective joint surfaces on the disk;
   heating and melting the joint surface on one of the blades and the respective joint surface on the disk by direct high frequency pressure welding, the step of heating and melting the joint surfaces further comprising the steps of: disposing one of the blades at a distance of 0.5 mm to 1 mm from the disk, at the same time electrically connecting the respective blade and the disk in series and conducting a high frequency current in the range of 0.75 MHz to 2.5 MHz in the respective blade and the disk, whereby a skin effect of the current and a proximity effect of the blade and the disk cause local melting in the region of the respective joint surfaces; and
   after the step of heating and melting, pressing the joint surface of the respective blade in a linear path onto the respective joint surface on the disk, the linear path being perpendicular to the respective joint surface of the blade, and the linear path being perpendicular to the respective joint surface of the disk.

2. A method for the production of an integrally bladed rotor of a high-pressure compressor, the method comprising the steps of:
   providing a disk that is configured for use on a high-pressure compressor, the disk being formed from Ti-6246;
   providing a plurality of blades that are configured for use on a high-pressure compressor, the blades being formed from Ti-6242 or Ti-6246; and
   welding each blade to the disk at joint surfaces by means of a conductive high-frequency pressure welding method supported by high-frequency current in the range of 0.75 MHz to 2.5 MHz;
   wherein the step of welding further comprises arranging electrodes on the disk and at least one of the blades, connecting the disk and the at least one of the blades in series in an electrical circuit, disposing the disk and the at least one of the blades between 0.5 mm to 1 mm apart so that a skin effect and a proximity effect of the high-frequency current leads to local heating and local melting of the joint surfaces;
   wherein the disk and the at least one of the blades are connected in series in an electrical circuit when they are disposed between 0.5 mm to 1 mm apart; and
   wherein the step of welding further comprises pressing the joint surface of the respective blade in a linear path onto the respective joint surface on the disk, the linear path being perpendicular to the respective joint surface of the blade, and the linear path being perpendicular to the respective joint surface of the disk.

3. The method of claim 2, wherein in the step of providing a disk, the disk has a lamellar structure.

4. The method of claim 2, wherein the step of providing a plurality of blades, the blades have a bimodal structure.

* * * * *